United States Patent [19]

Wang

[11] Patent Number: 4,632,890
[45] Date of Patent: Dec. 30, 1986

[54] ANODE METAL TREATMENT AND USE OF SAID ANODE IN CELL

[75] Inventor: Chih-Chung Wang, Lexington, Mass.

[73] Assignee: Duracell Inc., Bethel, Conn.

[21] Appl. No.: 749,688

[22] Filed: Jun. 28, 1985

[51] Int. Cl.$^4$ ............................................. H01M 4/04
[52] U.S. Cl. ................................... 429/218; 29/623.1;
204/292; 429/220; 429/221; 429/222; 429/223;
429/224; 429/225; 429/226; 429/230
[58] Field of Search ............... 29/623.1; 204/280, 292;
429/218, 220–226, 229, 230

[56] References Cited

U.S. PATENT DOCUMENTS

| | | | |
|---|---|---|---|
| 3,348,976 | 10/1967 | Kelly et al. | 429/229 |
| 3,926,672 | 12/1975 | Curelop et al. | 429/230 |
| 4,104,188 | 8/1978 | Nicaise | 429/230 |
| 4,207,391 | 6/1980 | Church et al. | 429/229 |

FOREIGN PATENT DOCUMENTS

| | | | |
|---|---|---|---|
| 45-7245 | 12/1970 | Japan | 429/230 |
| 78455 | 5/1984 | Japan | 429/230 |

Primary Examiner—Terryence Chapman
Attorney, Agent, or Firm—Ronald S. Cornell

[57] ABSTRACT

Gassing is significantly reduced in electrochemical cells having anodes of polycrystalline metals, such as zinc, by heat treatment of the anode metal at a temperature below that of the melting point of the metal for a period of time sufficient to reduce the number of grains in the polycrystalline metal to at least a third of the original number of grains and thereafter using the metal in the formation of the cell anode. With such gassing reduction, the amount of mercury required for amalgamation with the zinc may also be reduced.

18 Claims, 2 Drawing Figures

ANODE METAL TREATMENT AND USE OF SAID ANODE IN CELL

This invention relates to methods and materials used for reducing gassing in electrochemical cells as well as the amount of mercury required in anode amalgamations for such cells.

Metals such as zinc have been commonly utilized as anodes in electrochemical cells, particularly in cells with aqueous alkaline electrolytes. In such cells the zinc is amalgamated with mercury in order to prevent or reduce the extent of reaction of the zinc with the aqueous electrolyte with the detrimental evolution of hydrogen gas. In the past it has been necessary to utilize about 6-7% by weight of mercury amalgamation in the anode to reduce the amount of "gassing" to acceptable levels. However, because of environmental considerations it has become desirable to eliminate or, at the very least, reduce the amount of mercury utilized in such cells but without concomitant increase in cell gassing. Various expedients have been utilized, to achieve such mercury reduction, such as special treatment of the zinc, the use of additives and exotic amalgamation methods. However, such methods have either had economic drawbacks or limited success.

It is an object of the present invention to provide an economic means for reduction of gassing in electrochemical cells.

It is a further object of the present invention to provide a relatively economic means for permitting the reduction of amounts of mercury used in amalgamation of aqueous electrochemical anode metals without significant concomitant increase in cell gassing or reduction of cell performance.

BRIEF DESCRIPTION OF THE FIGURES

These and other objects, features and advantages of the present invention will become more evident from the following discussion as well as the "drawings" in which.

Figure 1:
FIG. 1 is a photomicrograph of cross sectioned polycrystalline zinc particles.

Generally the present invention comprises a method for making an electrochemical cell, with reduced gassing, involving anode metal material treatment. The invention further comprises the cell containing the treated anode material. The method of the present invention generally comprises reducing the number of grains in the polycrystalline anode metal to one third or less of the original number of grains. Thereafter, the reduced grain anode metal is formed into an anode such as by pouring powder particles either on a substrate or within a cavity. Alternatively, the anode metal may be in the form of a sheet with the anode being convolutely wound in a "jelly roll" configuration together with the cell separator and cathode. The sheet metal may also be used, without winding, in a prismatic cell. If desired, the anode metal (particularly zinc) is amalgamated with mercury after the grain reduction and prior to placement of the anode metal in the cell. In all the aforementioned embodiments, with such extent of grain reduction there is a concomitant reduction in the extent of grain boundaries and a reduction of gassing at such sites.

In order to effect such reduction in the number of grains, polycrystalline anode materials such as zinc are heat treated at a temperature below the melting point thereof for a sufficient time whereby the number of grains in the polycrystalline material is reduced to one third or less of the original material.

Though the anode material remains polycrystalline after the heat treatment of the present invention, the amount of grain boundaries are reduced with the reduction in number of grains. As a result, the amount of gassing in the cell, with the treated particles, is markedly reduced since it is the area of the grain boundaries which is most conducive to high chemical activity and gas formation. In addition, mercury infiltrates into grain boundaries readily. With the reduction of grain boundaries there is a reduction in the amount of mercury required for amalgamation with the anode material. With the reduced grain anode materials the amount of mercury required for amalgamation can be effectively reduced from about 6-7% to up to about 4%.

Heat treatment of the anode material is dependent upon the factors of purity of the polycrystalline starting material, the temperature at which the heat treatment is effected, and the duration of such heat treatment. It is understood that heat treatment of powder particles of different bulk quantity may differ in length of time required since the interior of the aggregate is somewhat insulated by exterior material and does not "see" the same amount is heat as external material in direct receipt of the heat. In practice, a continuous tumbling calcined furnace will provide most effective heating and as a result, with properly designed calciner, less than ten minutes at temperatures above 370° C. is sufficient to effect sufficient grain reduction. Recrystallization and grain coarsening depends upon many factors such as temperature, time, strain energy within the material, and the purity. As a result, exact heat treatment parameters are determined in accordance with the specific heat treatment equipment being utilized. For clarity, the effective heat and temperature, hereinafter referred to, relate to a direct application of heat to the material. In all events, a reduction of the number of grains in the material to one third or less of the original material is the desired result.

The heat treatment of the polycrystalline anode material is effective with both powdered material generally used in the construction of poured anodes in cells having a bobbin type structure, and such treatment is also effective with respect to the treatment of metal strips or sheets utilized in prismatic or convolutely wound cell structures.

The purity of the initial polycrystalline anode material determines, in part, the length of time required to provide the requisite reduction of grains or conversely the temperature at which the material should be heated for a given period of time; the lower the purity, the higher the temperature or the longer the time period required. The most common anode material for electrochemical cells is zinc with the most common impurity contained therein being lead. Other, less common, anode materials include cadmium, nickel, magnesium, aluminum, manganese, calcium, copper, iron, lead, tin and mixtures thereof including mixtures with zinc.

The alkaline electrolyte solution in which the anode material is placed and which generally is a factor in the gas generation (usually the anode reacts with the electrolyte with resultant gas formation) is usually an aqueous solution of a hydroxide of alkali or alkaline earth metals such as NaOH and KOH. Common cathodes for the alkaline cells include manganese dioxide, cadmium oxide and hydroxide, mercuric oxide, lead oxide, nickel oxide and hydroxide, silver oxide and air. The polycrystalline anodes of the present invention however are also of utility in cells having other electrolytes in which gassing of the anode is problematical such as in acid type electrolytes.

Common alkaline type cells contain poured polycrystalline zinc particles having an average particle size of about 100 microns. Each of such particles has about 16 or more grains and in accordance with the present invention the number of grains in each of the particles is reduced by heating the zinc particles at an effective temperature between about 50 to 419.5° C. (the latter being the melting point of zinc) for a minimum period of time ranging from about two hours at 50° C. to about five minutes at 419.5° C. to reduce the amount of grains to an average of about 3 to 5 grains per particle. Zinc particles having lead impurities require a temperature of about 100° C. for the minimum two hour period to achieve a similar reduction in number of grains.

In order to more clearly illustrate the effectiveness of the present invention in reducing cell gassing, the following comparative examples are presented. It is understood that such examples are for illustrative purposes only and that details contained therein are not to be construed as limitations on the present invention. Unless otherwise indicated herein and throughout the present specification all parts are parts by weight.

EXAMPLE 1

Three batches of polycrystalline zinc of average particle size of about 100 microns are heat treated for varying periods of time and temperatures and are then amalgamated with about 4% mercury by weight. A fourth batch of 4% mercury amalgamated polycrystalline zinc is not heat treated and is used as a control. Two grams of each batch are placed in 37% KOH solutions (similar to the electrolyte of alkaline cells) at 90° C. with heating parameters and gassing rates given in Table 1:

TABLE 1

| Zinc Treatment | ml gas (24 hours) | ml gas (93 hours) |
| --- | --- | --- |
| Control, not heated | 0.62 | 3.77 |
| 114 hours at 400° C. | 0.25 | 2.07 |
| 235 hours at 400° C. | 0.28 | 2.78 |
| 70 hours at 419° C. | 0.28 | 2.18 |

It is evident from the above that the heat treatment of the present invention serves to more than halve the gassing rate of amalgamated zinc. It is further evident that continued long term heating does not significantly affect gassing rates and is generally economically undesirable.

EXAMPLE 2

Polycrystalline zinc powder (average particle size of 100 microns) from the New Jersey Zinc Co. (NJZ) is heat treated at 370° C. by tumbling for one hour in a rotating calcine furnace. The powder, as received from New Jersey Zinc, has the crystalline structure shown in FIG. 1. After the heat treatment the powder has the crystalline structure shown in FIG. 2 wherein grain size is markedly increased, the number of grains is reduced and the amount of grain boundaries is concomitantly reduced. The polycrystalline zinc, as received and after heat treatment is amalgamated with 4% mercury and two gram samples of each are tested for gassing as in Example 1. An additional two gram sample of 7% mercury amalgamated zinc from Royce Zinc Co., with similar polycrystalline grain structure and average particle size, is also treated for gassing as an additional control (representing prior art amalgamated zinc) with gassing results given in Table 2:

TABLE 2

| Zinc Type | Gassing (ml) after 24 hours at 90° C. |
| --- | --- |
| As received from NJZ 4% Hg | 0.85 |
| Heated at 370° C. for 1 hour 4% Hg | 0.4 |
| 7% Hg Royce | 0.25 |

Heat treatment, as described, provides an anode material having markedly superior gassing properties when compared to untreated polycrystalline zinc and slightly worse than prior art amalgamated zinc having considerably more mercury in the amalgam.

EXAMPLE 3

Two grams of each of the amalgamated zinc materials of Example 2 are similarly tested for gassing at 71° C. after periods of 7 and 14 days with the results given in Tables 3 and 4:

TABLE 3

| Zinc Type | 7 Days (ml gas) | 14 days (ml gas) |
| --- | --- | --- |
| As received from NJZ 4% Hg | 0.98 | 1.95 |
| Heated at 370° C. for 1 hour 4% Hg | 0.50 | 1.19 |
| 7% Hg Royce | 0.46 | 0.95 |

TABLE 4

| | Gassing Rate (ul/gm-day) | | |
| --- | --- | --- | --- |
| Zinc Type | 0–7 Days | 7–14 days | 0–14 days |
| As received from NJZ 4% Hg | 70 | 69 | 70 |
| Heated at 370° C. for 1 hour 4% Hg | 36 | 49 | 43 |
| 7% Hg Royce | 33 | 35 | 34 |

Both the total amount of evolved gas and the gassing rate of heat treated zinc powders, after extended periods of time, are comparable to those of zinc powders amalgamated with significantly more mercury.

Figure 2:
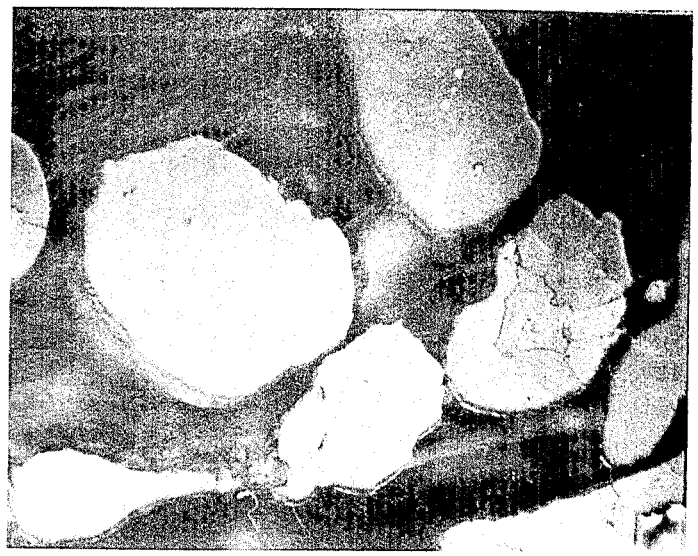
FIG. 2 is a comparative photomicrograph of cross sectioned polycrystalline zinc as treated in accordance with the present invention.

It is evident from the photomicrographs of FIGS. 1 and 2 that the numerous polycrystalline grain boundaries have been reduced in number with a concomitant reduction in the number of polycrystalline grains per particle without general change in the shape of the individual particles. The number of grains in the heat treated particles is a third or less of that of the original particles.

It is understood that the above examples are illustrative in nature and that details contained therein are not to be construed as limitations on the present invention. Changes such as in particle size and heat treatment parameters may be made without departing from the scope of the present invention as defined in the following claims.

What is claimed is:

1. A method for making an electrochemical cell, with reduced gassing, with said cell having a polycrystalline metal anode, comprised of individual particles of said polycrystalline metal, and being subject to gassing, said method comprising the steps of:

(a) reducing the number of grains in each of said polycrystalline metal particles to one third or less of the original number of grains without general change in the shape of the individual particles;
(b) forming said individual polycrystalline metal particles, with reduced number of grains, into an anode for said cell; and
(c) placing said formed polycrystalline metal anode into said cell.

2. The method of claim 1 wherein said polycrystalline metal is heated at an elevated temperature, below the melting point of said metal, for a time sufficient to reduce the number of grains in said polycrystalline metal to one third or less, of the original number of grains.

3. The method of claim 2 wherein said polycrystalline metal is selected from the group consisting of zinc, cadmium, nickel, magnesium, aluminum, manganese, calcium, copper, iron, lead, tin and mixtures thereof.

4. The method of claim 3 wherein said polycrystalline metal is zinc.

5. The method of claim 4 wherein said polycrystalline zinc is comprised of particles and said anode is formed by pouring of said particles.

6. An electrochemical cell subject to reduced gassing made in accordance with the method of claim 2.

7. An electrochemical cell subject to reduced gassing made in accordance with the method of claim 1.

8. A method for making an electrochemical cell, with reduced gassing, with said cell having a polycrystalline metal anode subject to gassing, said method comprising the steps of:
(a) heating said polycrystalline metal at an elevated temperature, below the melting point of said metal, for a time sufficient to reduce the number of grains in said polycrystalline metal to one third or less of the original number of grains,
(b) forming a cell having an anode comprising said polycrystalline metal, with reduced number of grains,
wherein said polycrystalline zinc is amalgamated with mercury after the step of reducing the number of grains.

9. The method of claim 8 wherein said mercury comprises up to 4% by weight of said anode.

10. An electrochemical cell subject to reduced gassing made in accordance with the method of claim 9.

11. The method of claim 8 wherein said polycrystalline zinc is heated at a temperature of between 50° C. to 419.5° C. for a minimum period of time ranging between five minutes and two hours.

12. The method of claim 11 wherein said polycrystalline zinc is heated for at least 10 minutes at a temperature of at least 370° C.

13. The method of claim 11 wherein said polycrystalline zinc contains a lead impurity and wherein said polycrystalline zinc is heated at a temperature of at least 100° C.

14. The method of claim 8 wherein said polycrystalline zinc is comprised of sheets.

15. The method of claim 14 wherein said anode is convolutely wound within said cell.

16. An electrochemical cell subject to reduced gassing made in accordance with the method of claim 8.

17. The cell of claim 16 wherein said cell contains an alkaline electrolyte.

18. A method for making an electrochemical cell, with reduced gassing, with said cell having a polycrystalline metal anode subject to gassing and wherein said polycrystalline metal is selected from the group consisting of zinc, cadmium, nickel, magnesium, aluminum, manganese, calcium, copper, iron, lead, tin and mixtures thereof, said method comprising the steps of:
(a) reducing the number of grains in said polycrystalline metal to one third or less of the original number of grains wherein said polycrystalline metal is heated at an elevated temperature, below the melting point of said metal, for a time sufficient to reduce the number of grains in said polycrystalline metal to one third or less of the original number of grains;
(b) thereafter amalgamating said polycrystalline zinc with mercury; and
(c) forming a cell having said polycrystalline metal, with reduced number of grains, as anode.

* * * * *